United States Patent [19]

Kimura et al.

[11] Patent Number: 5,043,843
[45] Date of Patent: Aug. 27, 1991

[54] FILM CAPACITOR AND METHOD OF MAKING THE SAME

[75] Inventors: Tadashi Kimura, Yawata; Tanejiro Ikeda, Nara; Minoru Kikuchi, Matsue; Kunio Oshima, Matsue; Shinsuke Itoi, Hikawa, all of Japan

[73] Assignee: Matsushita Electric Industrial Co., Ltd., Kadoma, Japan

[21] Appl. No.: 437,436

[22] Filed: Nov. 16, 1989

[30] Foreign Application Priority Data

Nov. 16, 1988 [JP] Japan .................................. 63-289318

[51] Int. Cl.⁵ .......................... H01G 3/26; H01G 7/00
[52] U.S. Cl. ..................... 361/308; 29/25.42; 361/323
[58] Field of Search ............... 29/25.42; 361/323, 308, 361/309, 310, 306, 303, 304, 305, 311–313

[56] References Cited

U.S. PATENT DOCUMENTS

| 1,479,315 | 1/1924  | Pickard  | 29/25.42 X |
| 3,211,973 | 10/1965 | Ferrante | 361/309 X  |
| 3,617,834 | 11/1971 | Rayburn  | 29/25.42 X |
| 3,909,894 | 10/1975 | Muller   | 361/308 X  |

FOREIGN PATENT DOCUMENTS

| 0158971   | 10/1985 | European Pat. Off. .    |
| 2645129   | 4/1977  | Fed. Rep. of Germany .  |
| 3003089   | 8/1980  | Fed. Rep. of Germany .  |
| 3422571A1 | 12/1985 | Fed. Rep. of Germany .  |
| 7429861   | 4/1975  | France .                |

Primary Examiner—Donald A. Griffin
Attorney, Agent, or Firm—Wenderoth, Lind & Ponack

[57] ABSTRACT

A film capacitor which has a plurality of electrodes; at least one layer of dielectric member made of organic material and interposed between each pair of neighboring electrodes; impreganated members made of organic material and disposed in a gap between the electrode and the dielectric layer or between the dielectric layers; and end electrodes applied respectively to opposite electrode drawout end faces and connected alternately with the electrodes. The dielectric layers and the impregnated members alternate with each other and have respective end faces. The end portions of the dielectric layers and impregnated members are indented to provide respective indented end face.

12 Claims, 7 Drawing Sheets

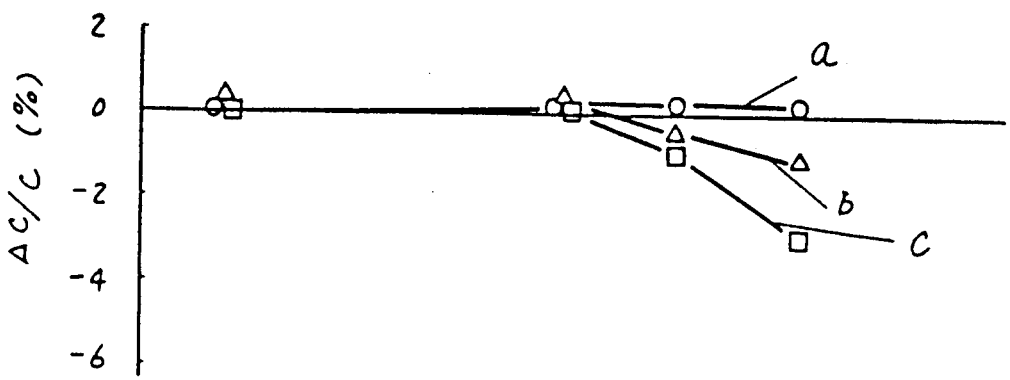
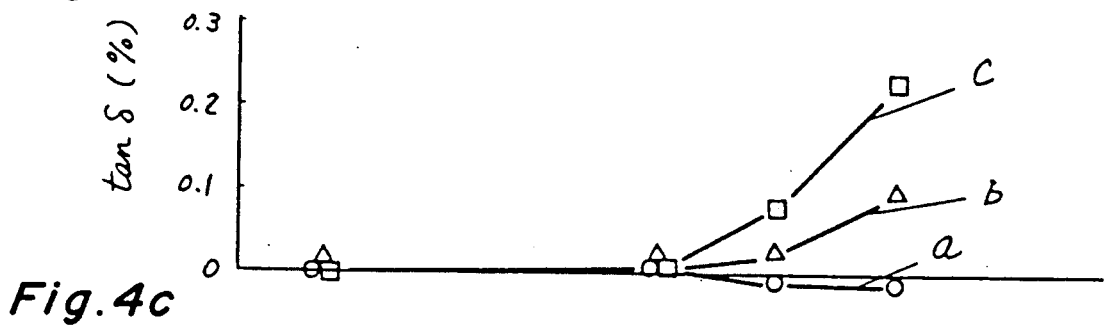
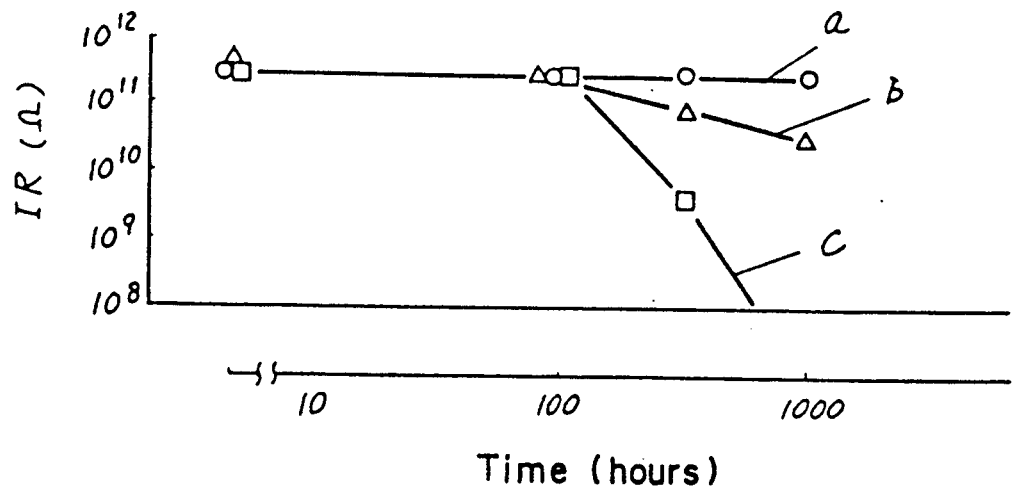

FILM CAPACITOR AND METHOD OF MAKING THE SAME

BACKGROUND OF THE INVENTION

1. Field of the Invention

The present invention relates to a film capacitor and a method of making the same.

2. Description of the Prior Art

The advent of the age of electronic engineering in various fields has emphasized the need to reduce the size, weight and price of electronic component parts while increasing the performance of these electronic component parts. This includes film capacitors and various attempts have hitherto been made to miniaturize a film capacitor in the form of a chip. Research has also been made to improve the dielectric strength and the moisture resistance of the film capacitor for the purpose of increasing the performance thereof.

One of the major causes of lowering both of the dielectric strength and the moisture resistance of the film capacitor appears to be the inclusion of air in between the neighboring laminae, for example, between a dielectric film and a film electrode, or between the dielectric film and a metal film, when the dielectric film and the film electrode are laminated one above the other or when the metal film is formed on the dielectric film to provide a metalized film. The presence of air gaps in the laminated body tends to allow water to intrude into the air gaps, eventually corroding some of the electrodes to such an extent as to result in a corona discharge accompanied by deterioration of films and electrodes. The consequence is that both the operating characteristics and the performance of the film capacitor are lowered.

In order to avoid the above discussed problems, an attempt has been made to fill up the air gaps with an electrically insulating material such as epoxy resin, polyurethane resin, oil or wax, thereby to improve the moisture resistance.

FIGS. 6a to 6e illustrate the sequence of making an example of the prior art film capacitors, so-called impregnated film capacitors, in which the electrically insulating material, for example, epoxy resin or polyurethane resin, is utilized to fill up the air gaps present in the laminated body, reference to which will now be made for the discussion of the prior art method of making the impregnated film capacitor.

In these FIGS. reference numeral 61 designates one-side metalized films each comprising a metallic foil 61a which eventually forms an electrode and formed on one of opposite surfaces of a respective film 61b by the use of, for example, a vacuum deposition technique. Reference numeral 62 designates a film gap defined between every other film; reference numeral 63 designates a marginal area which is a non-metalized area; and reference numeral 65 designates a film capacitor element.

According to the prior art, the one-side metalized films 61 are coiled or laminated while displaced alternately in a direction widthwise thereof to form alternating film gaps between every other film, thereby to provide the film capacitor element 65 as shown in FIG. 6a. Alternatively, the film capacitor element 65 may be formed by coiling or laminating a plurality of one-side metalized films of relatively large width embossed or otherwise perforated, and then by cutting a portion of each one-side metalized film which corresponds in position to one end thereof from which an electrode is drawn.

Then, as shown in FIG. 6b, opposite end electrodes 66 are formed at the opposite ends of the one-side metalized films, or the film capacitor element 65, in electrically connected relation with the electrodes 61a by the use of any known spray coating technique. The resultant capacitor element having the opposite end electrodes 66 is shown by 67 in FIG. 6c.

The capacitor element 67 is subsequently cut into a plurality of capacitor chips 67 as shown in FIG. 6d, which chips 67 are subsequently transported to a vacuum chamber where they are immersed in bath a containing epoxy resin or polyurethane resin to allow the epoxy or polyurethane resin to penetrate into air gaps or clearances formed during the lamination of the capacitor films 61. Thereafter, the capacitor chips 67 having been immersed in the resin bath are removed from the vacuum chamber and, in an atmospheric environment, the resin is allowed to cure to form a resin layer 68 between each neighboring one-side metalized film 61 as shown in FIG. 6e so that the resultant film capacitors can have an increased moisture resistance and an increased dielectric strength.

However, it has been found that the prior art method hereinabove described still has the following problems.

(1) Since the end electrodes have been formed prior to the capacitor element being immersed in the resin bath, the resin does not uniformly penetrate into the air gaps formed during the lamination of the films. Because of this, some or all of the capacitor chips still contain air gaps and, therefore, neither sufficient moisture resistance nor sufficient dielectric strength can be obtained.

(2) Since the end electrodes formed by the use of the metal spray coating technique contain voids, the resin tends to penetrate into the voids in the end electrodes and also to cover the end electrodes. Because of this, where lead wires are required to be welded to the respective end electrodes, the weldability tends to be lowered, or where lead wires are required to be soldered to the respective end electrodes, the solderability tends to be lowered because solder deposits fail to stick to the end electrodes.

(3) The method step during which the resin is filled into the air gap between each neighboring films requires a relatively long period of time, for example, about 12 hours.

SUMMARY OF THE INVENTION

The present invention has been devised with a view to substantially eliminating the above discussed problems inherent in the prior art method of making the film capacitors and has for its object to provide an improved film capacitor having a high moisture resistance and a high dielectric strength and to which lead wires can be easily and firmly connected to the end electrodes.

Another important object of the present invention is to provide an improved method of making the film capacitors of the type referred to above, wherein the period during which the capacitor elements are immersed in the resin bath can be reduced, thereby to facilitate the manufacture of the film capacitors with a high productivity.

To this end, the present invention provides a film capacitor which comprises a plurality of electrodes, at least one layer of dielectric made of organic material and interposed between each neighboring electrodes, an impregnated member made of organic material and disposed in a gap between the electrode and the dielectric layer or between the dielectric layers, and end electrodes applied respectively to opposite electrode draw-out end faces and connected alternately with the electrodes, said dielectric layers and said impregnated members alternating with each other and having respective end faces, the end faces of one of said dielectric layers and impregnated members and the end faces of the other of said dielectric layers and impregnated members being set back relative to each other to provide a respective indented end face.

The present invention also provides a method of making the film capacitor of the construction described above, which method comprises the steps of preparing a laminated or coiled body comprising a plurality of electrodes and at least one layer of dielectric body made of organic material and interposed between each neighboring electrodes, impregnating the laminated or coiled body with an impregnated member made of organic material so as to fill up a gap which is defined between each electrode and the associated dielectric member or between the neighboring dielectric members, causing opposite electrode draw-out end faces of the coiled or laminated body to contact a gaseous body, containing organic material and a reactive component, to selectively remove respective portions of the dielectric members and the impregnated members which are aligned with each of the opposite electrode draw-out end faces, and shaping end electrodes.

In the film capacitor herein provided according to the present invention, the respective portions of the dielectric members and the impregnated members which are aligned with the electrode draw-out end faces are selectively removed to allow the electrodes to be partially exposed to the outside through the end faces. Therefore, the end electrodes can be favorably electrically connected with the outwardly exposed portions of the respective electrodes, thereby establishing a firm and assured electric contact therebetween.

Also, since the end portions of the dielectric members and those of the impregnated members are set back relative to each other to form the indented surface at each of the electrode draw-out end faces, the end electrodes can be firmly connected thereto. In addition, since the impregnated member fills up each gap which has been formed during the lamination of the capacitor constituents, the number of gaps in the resultant film capacitor can be minimized, whereby both the moisture resistance and the dielectric strength thereof are improved consequently.

In the practice of the method of the present invention, the end electrodes are formed subsequent to the impregnation with the impregnating material made of the organic material and, therefore, each of the gaps formed during the lamination of the capacitor constituents can be uniformly impregnated with the impregnated member. The method of the present invention is effective to provide an impregnated film capacitor wherein no impregnated member surfaces of the end electrodes and/or no impregnated member penetrate into the end electrodes and which is provided with end electrodes capable of exhibiting a favorable weldability with the lead wires or a favorable solderability with the lead wires.

In addition, the method of the present invention is effective to reduce considerably the length of time during which the impregnation is carried out and, therefore, productivity of the impregnated film capacitors can be enhanced.

BRIEF DESCRIPTION OF THE DRAWINGS

These and other objects and features of the present invention will become clear from the following description of a preferred embodiment thereof and with reference to the accompanying drawings, in which:

FIGS. 1a to 1f illustrates the sequence of manufacture of a film capacitor according to the present invention, wherein FIG. 1a is a fragmentary perspective view of a metalized film of relatively large width having marginal areas; FIG. 1b is a sectional view of a laminated body formed by laminating the metalized film shown in FIG. 1a; and FIGS. 1c to 1f illustrate respective method steps for the manufacture of the film capacitor according to the present invention;

FIGS. 4a to 4c are graphs showing high temperature load characteristics of the film capacitor according to the present invention together with those of the prior art film capacitor and film capacitor made for the purpose of comparison with that of the present invention;

DETAILED DESCRIPTION OF THE EMBODIMENT

Figure 1A:
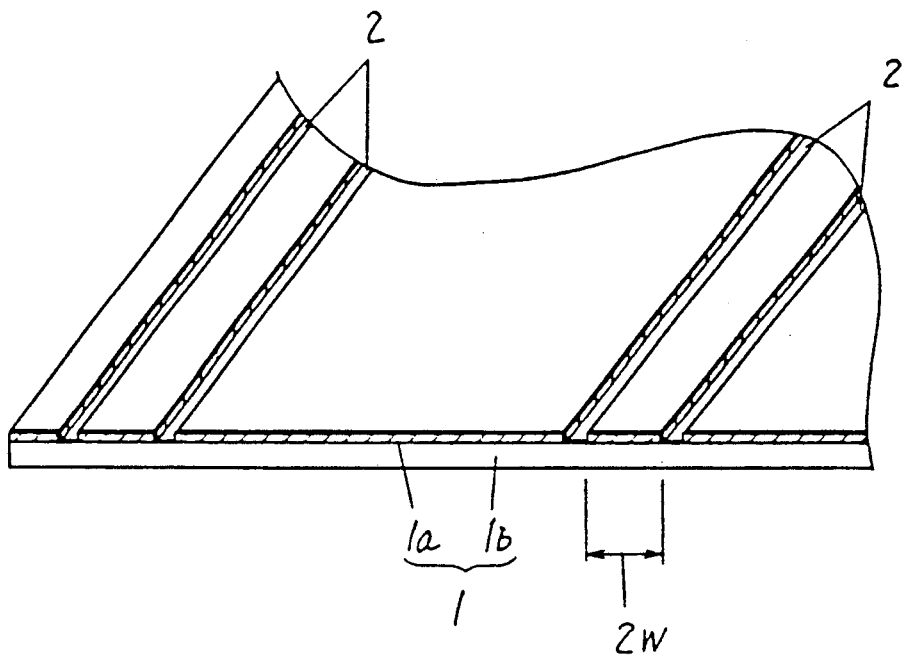

Hereinafter, the present invention will be described in connection with a film capacitor and a method of making the same with reference to the accompanying drawings.

FIGS. 1a to 1f illustrate the sequence of manufacture of the film capacitor according to the present invention. In these Figs. reference numeral 1 represents a metalized film comprising a dielectric film 1b made of polyphenylene sulfide film and having one of its opposite surfaces on which an internal electrode 1a made of aluminum is vapor-deposited. Reference numeral 2 designates pairs of elongated marginal areas each of which is a non-metalized area formed by removing a relevant portion of the internal electrode 1a; reference numeral 3 designates a capacitor matrix; reference numeral 4 designates impregnated layers of impregnating material; and reference numeral 5 designates end electrodes.

Figure 1B:
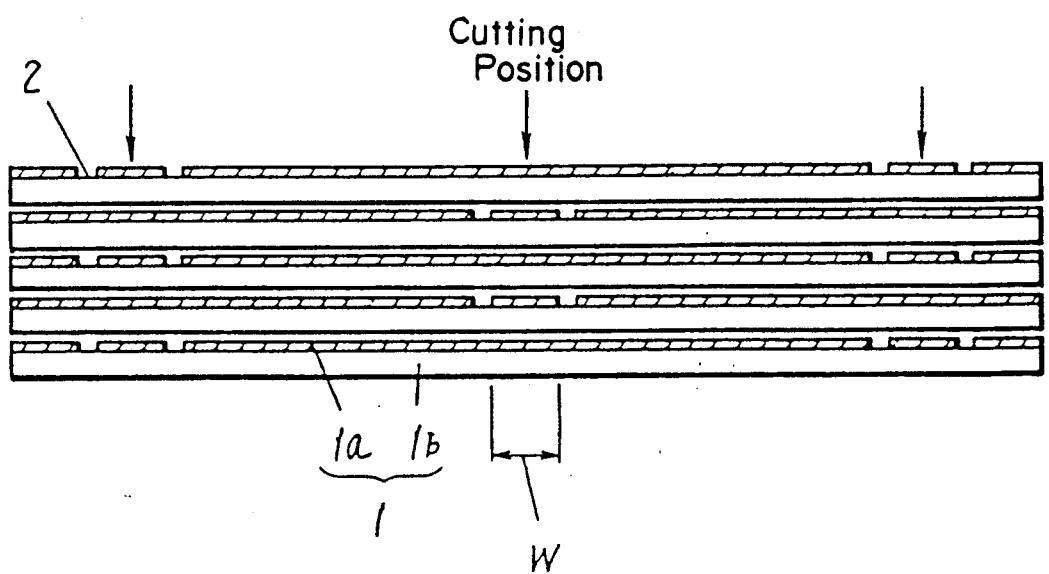
Figure 1C:
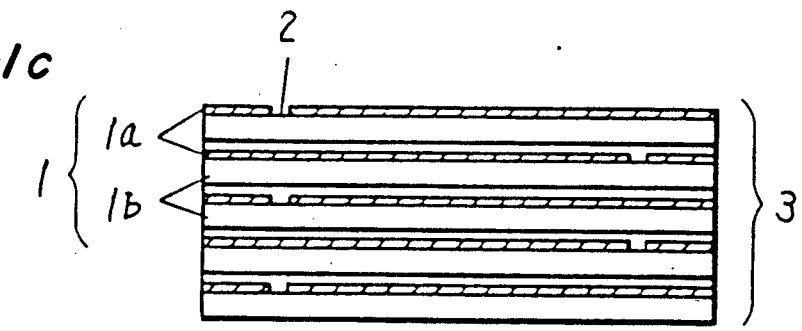

To manufacture the film capacitor according to the present invention, the internal electrode 1a is formed on one surface of the dielectric film 1b, as shown in FIG. 1a, to provide the metalized film 1 having the pairs of the elongated marginal areas 2 formed thereon, each of said marginal areas 2 having a longitudinal axis lying perpendicular to the lengthwise direction of the metalized film 1. It is to be noted that the marginal areas 2 of each pair are spaced a predetermined width 2w from each other. Then, as shown in FIG. 1b, the plural metalized films 1 of identical construction are laminated or coiled to provide a laminated body or a coiled body with films 1 stacked one above the other while alternately displaced from each other a distance equal to half the span between the neighboring pairs of the marginal areas 2, which laminated or coiled body is cut along a line intermediate the spacing between the marginal areas 2 of each pair thereby to provide the capacitor matrix 3 as shown in FIG. 1c.

Figure 1D:
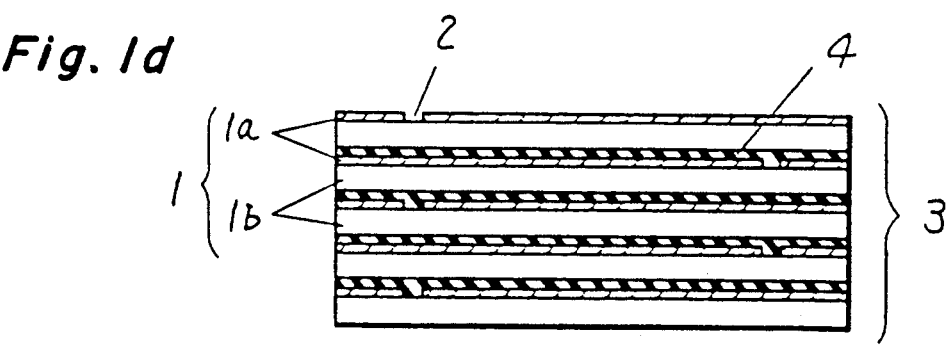

Subsequently, both the capacitor matrix 3 and epoxy resin are placed, and maintained for 15 minutes, within a vacuum vessel the pressure of which has been reduced to 0.1 Torr, to allow cause the capacitor matrix 3 to be immersed in the epoxy resin for 15 minutes. While the capacitor matrix 3 is immersed in the epoxy resin, air is slowly introduced into the vacuum vessel to increase the pressure inside the vacuum vessel progressively to the atmospheric pressure under which both the capacitor matrix 3 and the epoxy resin are allowed to stand for 15 minutes so that, as shown in FIG. 1d, the epoxy resin is caused to penetrate into a minute gap defined between the internal electrode 1a of each of the metalized films 1 and the non-metalized surface of the neighboring metalized film 1. Thereafter, the capacitor matrix 3 is placed and retained for 12 hours in a constant temperature bath heated to 85° C. to cause the epoxy resin to be cured, thereby completing the formation of the impregnated layer 4 between the internal electrode 1a of each of the metalized films 1 and the non-metalized surface of the neighboring metalized film 1.

Figure 1E:
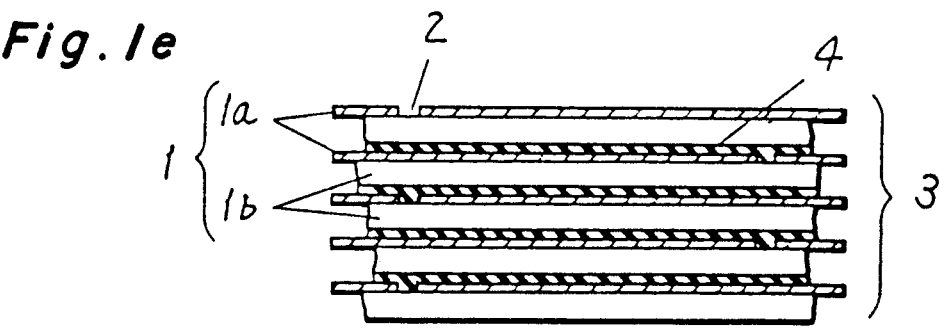
Figure 2:
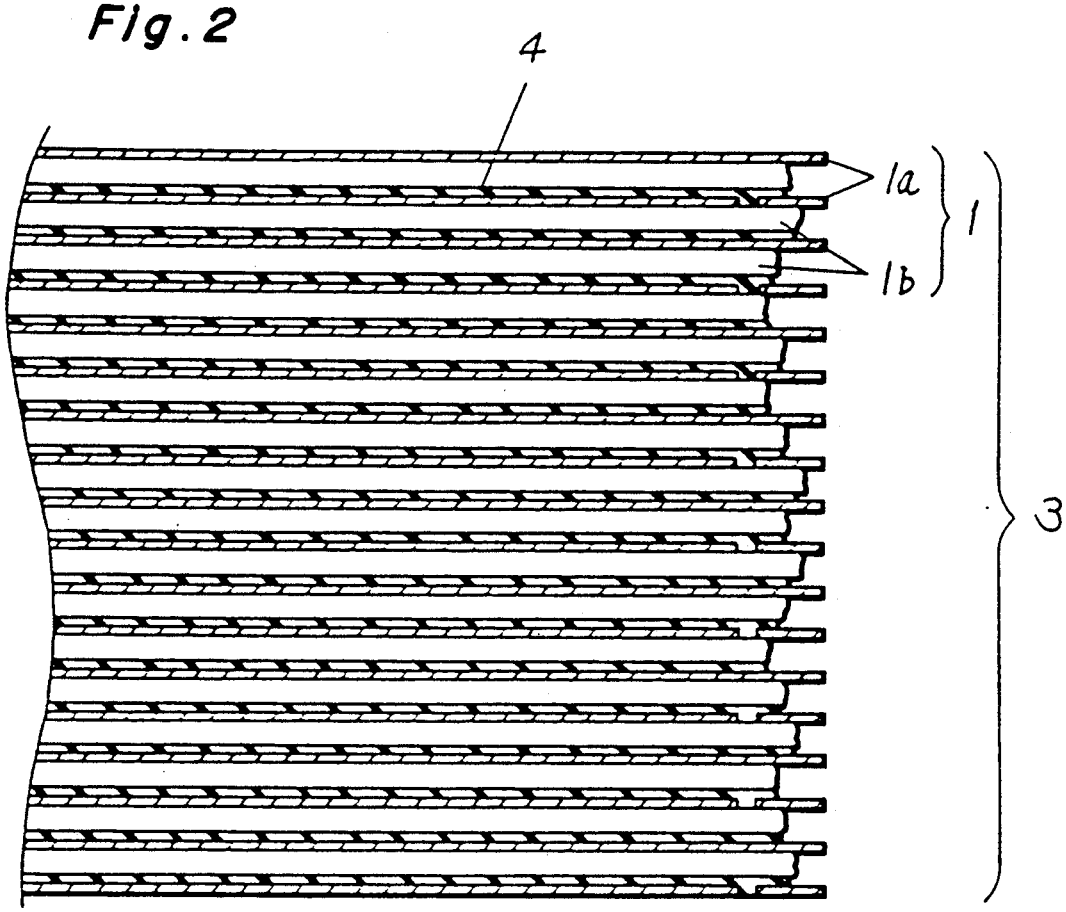
FIG. 2 is a sectional view, on an enlarged scale, showing a portion of the laminated body shown in FIG. 1e.

The capacitor matrix 3 having the impregnated layers 4 between the internal electrodes 1a and the non-metalized surfaces of the neighboring metalized films 1 adjacent such internal electrodes 1a is then placed in an oxygen plasma treating apparatus to cause opposite end faces of the capacitor matrix 3, from which respective end electrodes are to be drawn out, to contact an oxygen gas plasma so that, as shown in FIG. 1e, opposite end portions of each of the dielectric films 1b and the impregnated layers 4 which are at the respective end faces of the capacitor matrix 3 can be selectively removed in a width smaller than the width w/2 between the marginal areas 2 of each pair thereby to expose the internal electrodes 1a to the outside of the capacitor matrix 3. This treatment is carried out such that the end portion of each of the dielectric films 1b and the impregnated layers 4 at the associated end face of the capacitor matrix 3 is constituted as indentation with a roughened end face of a depth not greater than 0.2 mm from the end edges of the electrodes 1a with indentations in each indented end face occupying 90% or more of the surface area of such indented end face. Only the right-hand end of the capacitor matrix 3 showing the presence of the indentations in each right-hand portion of the dielectric films 1b and the impregnated layers 4 is illustrated in FIG. 2 on an enlarged scale.

The depth of the indentations at each end portion of the dielectric films 1b and the impregnated layers 4 which is not greater than 0.2 mm, is sufficient to allow end electrodes 5, which will be subsequently formed as will be described later, to be firmly electrically connected with the internal electrodes 1a. If the depth of the indentations is greater than 0.2 mm, the selective removal of those end portions of the dielectric films 1b and the impregnated layers 4 requires a relatively long time, accompanied by a lowering of the efficiency to utilize the material.

Figure 1F:
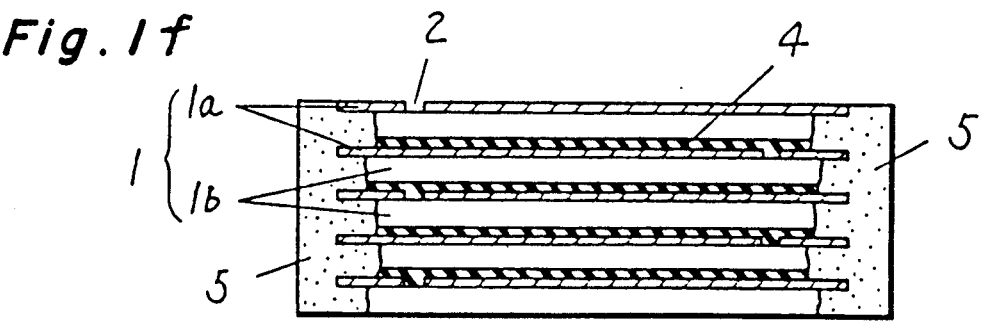

After the selective removal of those end portions in the capacitor matrix 3, the end electrodes 5 are formed as shown in FIG. 1f by spraying brass through a well-known metal spraying technique. Thereafter, the capacitor matrix 3 is cut in any well-known manner into a plurality of capacitor chips, thereby completing the manufacture of the film capacitors.

According to the present invention, prior to the formation of the end electrodes 5, an impregnating material such as, for example, the epoxy resin, is impregnated uniformly into the minute gap defined between the internal electrode 1a of each of the metalized films 1 and the non-metalized surface of the neighboring metalized film 1 to fill up such minute gap. Accordingly, both the moisture resistance and the dielectric strength of each of the resultant film capacitors can be advantageously increased.

Also, according to the present invention, the opposite end faces of the capacitor matrix 3, from which respective end electrodes are to be drawn out, are brought into contact with a gaseous material containing organic material and a reactive component, such as the oxygen gas plasma, so that the opposite end portions of the dielectric films 1b and the impregnated layers 4 which are at the respective end faces of the capacitor matrix 3 can be selectively removed to cause respective end portions of the internal electrodes 1a to be exposed to the outside of the capacitor matrix 3. Moreover, this treatment is carried out such that each end portion of each of the dielectric films 1b and the impregnated layers 4 at the associated end face of the capacitor matrix 3 are removed to provide the indented or roughened end face of a depth not greater than 0.2 mm with indentations in each indented end face occupying 90% or more of the surface area of such indented end face. This treatment is followed by the spraying of brass onto each of the end faces of the capacitor matrix 2 to form the end electrodes 5. Therefore, the end electrodes 5 which are firmly electrically connected with the internal electrodes 1a can be advantageously obtained.

Moreover, since the impregnating material such as the epoxy resin is impregnated prior to the formation of the end electrodes 5, there is no possibility that the impregnating material will be impregnated in each of the end electrodes 5 or that each of the end electrodes 5 may be covered with the impregnating material. Therefore, the weldability or solderability of lead wires relative to the end electrodes 5 can be advantageously improved. The employment of the resin impregnating process prior to the formation of the end electrodes 5 can bring about an additional advantage in that the time required to complete the resin impregnating process can be considerably shortened, whereby the mass-productivity of the film capacitors is increased consequently.

Also, since the resin impregnating process takes place before the capacitor matrix 3 is cut into the plural capacitor elements, the shape of each of the products to be impregnated during the resin impregnating process can be increased, accompanied by an increase in the mass-productivity.

Figure 3A:
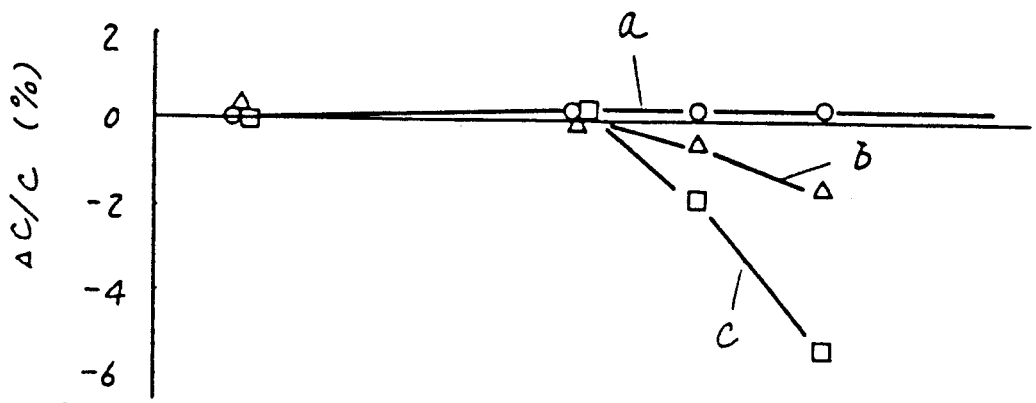
FIGS. 3a to 3c are graphs showing moisture resistant load characteristics of the film capacitor according to the present invention together with those of a prior art film capacitor and a film capacitor made for the purpose of comparison with that of the present invention.
Figure 3B:
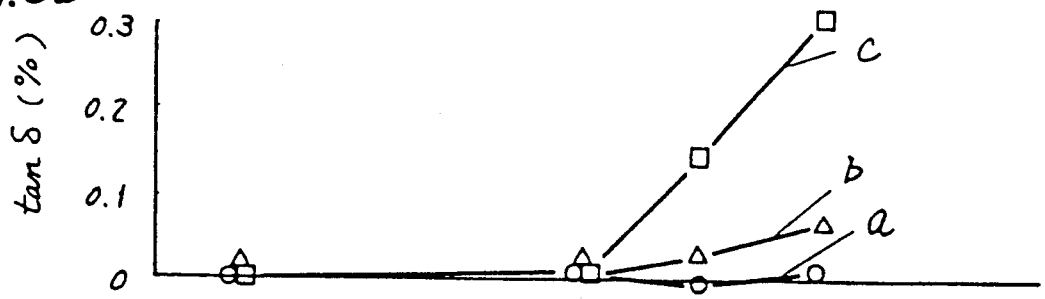
Figure 3C:
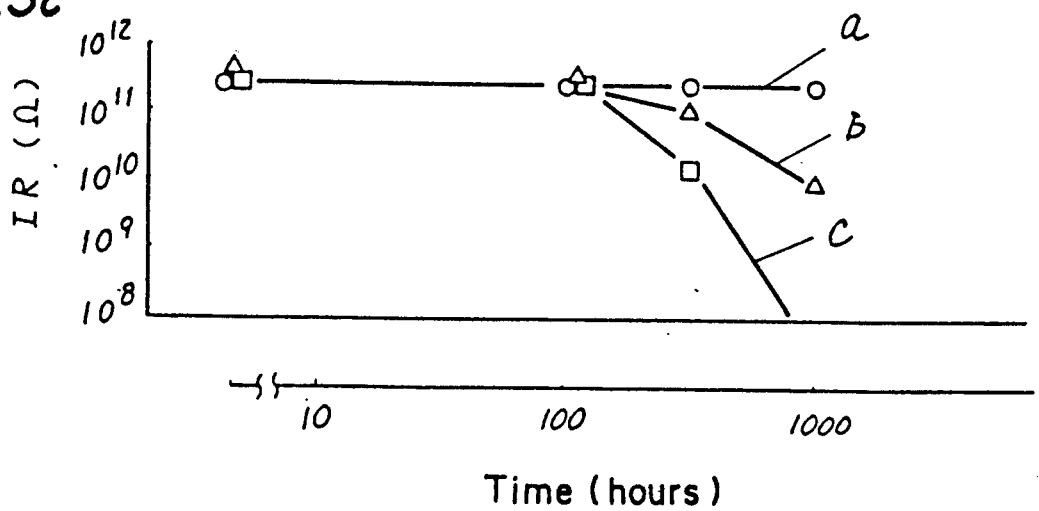
Figure 6A:
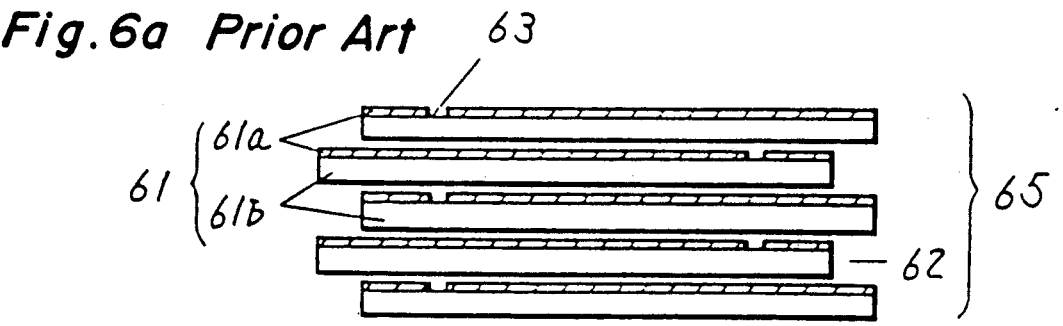
FIGS. 6a to 6e illustrate the sequence of manufacture of the prior art film capacitor.
Figure 6B:
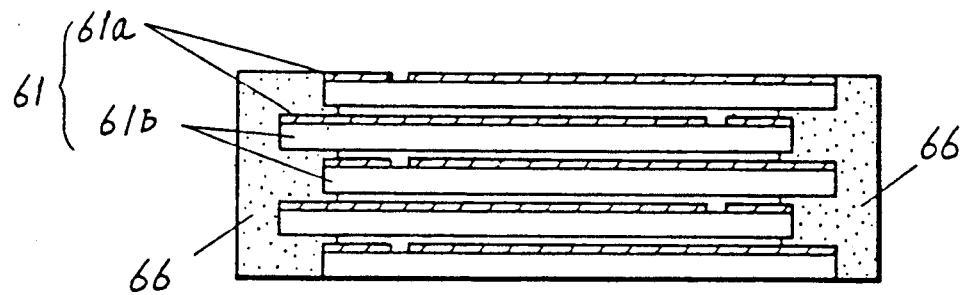
Figure 6C:
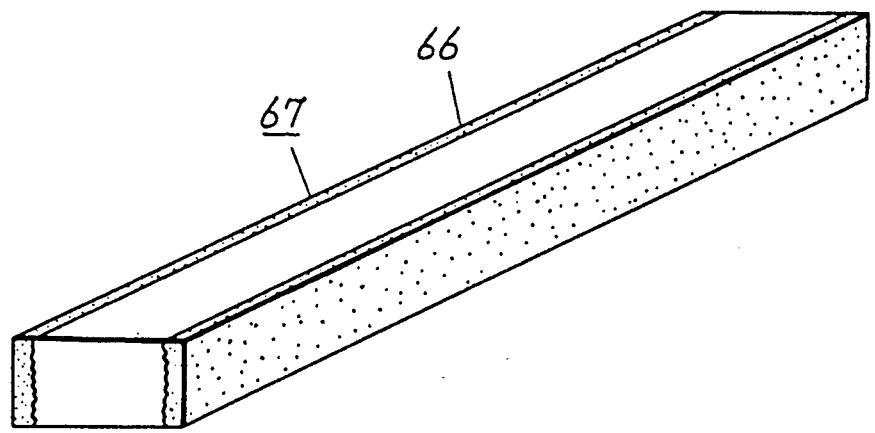
Figure 6D:
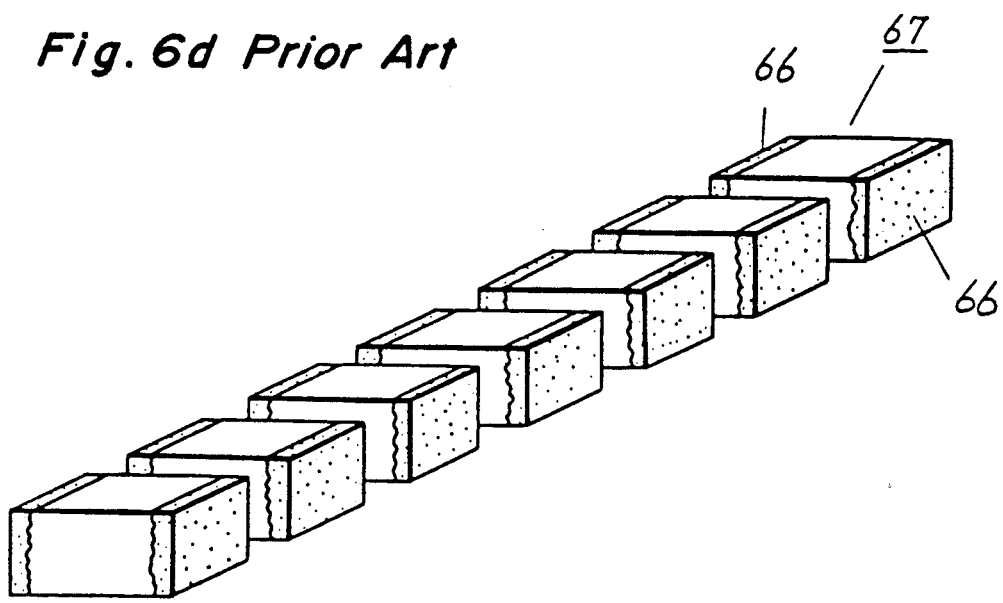
Figure 6E:
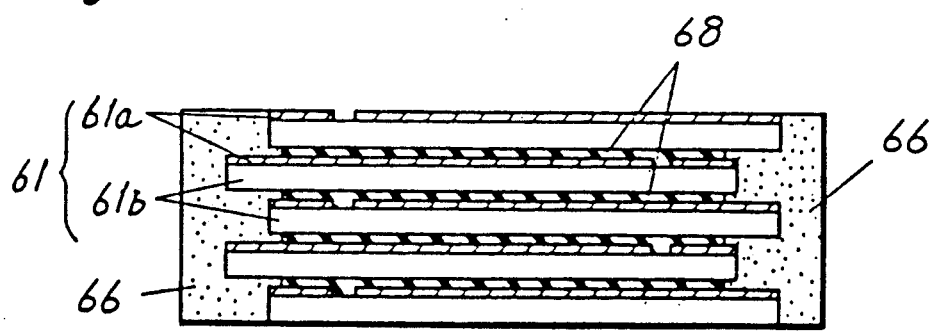

FIGS. 3a-3c are graphs showing moisture resistant load characteristics of the film capacitors according to the present invention together with those of the prior art film capacitors b and film capacitors c made without the resin impregnating process of the present invention, for the purpose of comparison with the present invention. In all of those film capacitors tested, each film had a thickness of 2 μm, each internal electrode was in the form of an aluminum vapor-deposited film of 300 angstrom in thickness, and the impregnating material employed was epoxy resin. The film capacitors were tested under testing conditions wherein the temperature was 60° C., the relative humidity was 95% and the voltage applied was 25 D.C. volts.

In particular, FIG. 3a illustrates the ratio ΔC/C of change in capacitance relative to the initial capacitance; FIG. 3b illustrates a change in tan δ characteristic; and FIG. 3c illustrates a change in insulation resistance IR. It is to be noted that the capacitance and the tan δ value were measured by the application of a sine wave voltage of 1 kHz in frequency and the insulation resistance IR was measured by the application of a direct current voltage of 25 volts.

Results of measurements shown in FIGS. 3a-3c illustrate that the film capacitors manufactured according to the present invention are considerably stabilized in all aspects of characteristic as compared with the prior art film capacitors b and c.

FIGS. 4a-4c are graphs of results of high temperature load tests carried out on the film capacitors according to the present invention shown together with those of the prior art film capacitors b and film capacitors c made, without employing a resin impregnating process, for the purpose of comparison with that of the present invention. In all of those film capacitors tested, each film had a thickness of 2 μm, each internal electrode was in the form of an aluminum vapor-deposited film of 300 angstrom in thickness, and the impregnating material employed was epoxy resin. The film capacitors were tested under testing conditions wherein the temperature was 125° C. and the voltage applied was 32 D.C. volts.

In particular, FIG. 4a illustrates the ratio ΔC/C of change in capacitance relative to the initial capacitance; FIG. 4b illustrates a change in tan δ characteristic; and FIG. 4c illustrates a change in insulation resistance IR. It is to be noted that measurement conditions were identical with those described above.

Even the results of the high temperature load tests illustrate that the film capacitors manufactured according to the present invention are considerably stabilized in all aspects of characteristic as compared with the prior art film capacitors b and c.

Figure 5:
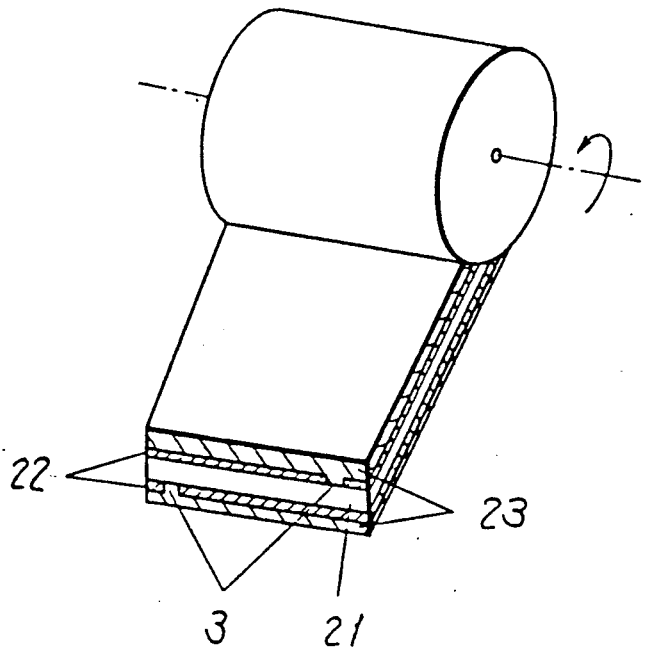
FIG. 5 is a schematic perspective view of a coil-type capacitor.

Although in the foregoing embodiment the plural metalized films have been described as laminated to form the laminated capacitor matrix, the capacitor matrix may be formed, as shown in FIG. 5, by preparing a metalized film comprising a film 21 having its opposite surfaces formed with internal electrodes 22, then coating or painting dielectric material on one of opposite surfaces of each internal electrode 22 remote from the film 21 to form a respective dielectric layer 23 and finally coiling the metalized film to provide a coiled capacitor matrix.

Also, reference has been made to the use of the oxygen plasma for selectively removing those end portions of each of the dielectric films, made of organic material, and the impregnated layers. However, in the practice of the present invention, ozone, hydrogen plasma or a plasma of fluorine gas may be employed in place of the oxygen plasma.

In addition, while the impregnating material employed in the foregoing embodiment has been described as the epoxy resin, polyurethane resin, wax or silicone oil may be employed in place of the epoxy resin. Where the polyurethane resin is employed and is to be impregnated in the minute gaps between the internal electrode of each of the metalized films and the non-metalized surface of the neighboring metalized film, the capacitor matrix should be allowed to stand in the constant temperature bath heated to 45° C.

Thus, according to the present invention, those end portions of the dielectric layers and the impregnated layers adjacent each of the opposite end faces of the capacitor matrix from which the respective end electrode is drawn out are selectively removed to make such end portions respective indented portions with roughened end faces while corresponding end portions of the internal electrodes are exposed to the outside. Accordingly, the end electrodes can be held in contact with the exposed end portions of the internal electrodes to establish a firm electric connection therebetween. At this time, each of the end electrodes stick to the respective end face of the capacitor matrix while intruding into the indentations and, therefore, a firm interlocking between each end electrode and the exposed end portions of the internal electrodes can be accomplished as compared with the prior art film capacitors. Also, the impregnating material fills up the minute gaps which are formed during the lamination of the metalized films and, therefore, both the moisture resistance and the dielectric strength of the resultant film capacitor can be increased considerably.

According to the method of the present invention, since the end electrodes are formed subsequent to the resin impregnating process, it is possible to cause the impregnating material to penetrate uniformly into the minute gaps which are formed during the lamination of the metalized films. In addition, there is no possibility that the impregnating material will be impregnated in each of the end electrodes or each of the end electrodes may be covered with the impregnating material and, therefore, the weldability or solderability of lead wires relative to the end electrodes can be advantageously improved. The employment of the resin impregnating process prior to the formation of the end electrodes can also bring about an additional advantage in that the time required to complete the resin impregnating process can be considerably shortened, whereby the mass-productivity of the film capacitors is increased consequently.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of making a film capacitor which method comprises the steps of:
preparing a laminated or coiled body comprising a plurality of electrodes and at least one layer of dielectric made of organic material and interposed between each neighboring electrode;
impregnating the laminated or coiled body with an organic material so as to fill up a gap which is defined between each electrode and the associated dielectric member or between the neighboring dielectric members with an impregnated member;
causing opposite end faces of the coiled or laminated body at which end edges of said electrodes are present to contact a gaseous material containing organic material and a reactive component, to selectively remove respective portions of the dielectric members and the impregnated members which are aligned with each of the opposite end faces; and forming end electrodes on said end faces.

2. The method as claimed in claim 1, wherein the selective removal of the respective portions of the dielectric members and the impregnated members is carried out by the use of a plasma containing at least oxygen.

3. The method as claimed in claim 1, wherein the selective removal of the respective portions of the dielectric members and the impregnated members is carried out by the use of a plasma containing oxygen and at least one of $CF_4$, $SF_6$ and $N_2O$.

4. The method as claimed in claim 1, wherein the selective removal of the respective portions of the dielectric members and the impregnated members is carried out by the use of oxygen radicals extracted from a plasma containing at least oxygen.

5. The method as claimed in claim 1, wherein the selective removal of the respective portions of the dielectric members and the impregnated members is carried out by the use of a gaseous body containing at least ozone.

6. The method as claimed in claim 1, wherein the selective removal of the respective portions of the dielectric members and the impregnated members is carried out by the use of a gaseous body containing ozone added with $NO_2$.

7. The method as claimed in claim 5 or 6, wherein, when the respective portions of the dielectric members and the impregnated members are selectively removed chemically and, ultraviolet rays are radiated.

8. The method as claimed in claim 1, wherein the respective portions of the dielectric members and the impregnated members are selectively removed chemically by the use of a gas plasma containing at least fluorine or hydrogen.

9. The method as claimed in claim 1, wherein impregnating material used to form the impregnated members is selected from the group consisting of epoxy resin and polyurethane resin, and further comprising the step of curing the impregnated members subsequent to the impregnating step.

10. A film capacitor which comprises:
a plurality of electrodes having end edges;
at least one layer of dielectric made of organic material and interposed between each pair of neighboring electrodes;
impregnated members made of organic material and disposed in a gap between an electrode and a dielectric layer or between dielectric layers;
said dielectric layers and said impregnated members alternating with each other between electrodes and having respective end faces, the end portions of said dielectric layers and impregnated members being indented from the end edges of said electrodes to provide respective indentations with opposed electrode surfaces which are free of dielectric and impregnated members; and
end electrodes applied to the respective opposite end faces of said film capacitor and electrically contacting said end edges of said electrodes and said opposed electrode surfaces.

11. The film capacitor as claimed in claim 10, wherein impregnating material used to form the the organic members is selected from the group consisting of epoxy resin, polyurethane resin, silicone oil and wax.

12. A film capacitor as claimed in claim 10 in which said indentations are no greater than 0.2 mm.

* * * * *